Aug. 19, 1924.
A. F. MUTH
1,505,280
BELT TIGHTENER
Filed April 28, 1923
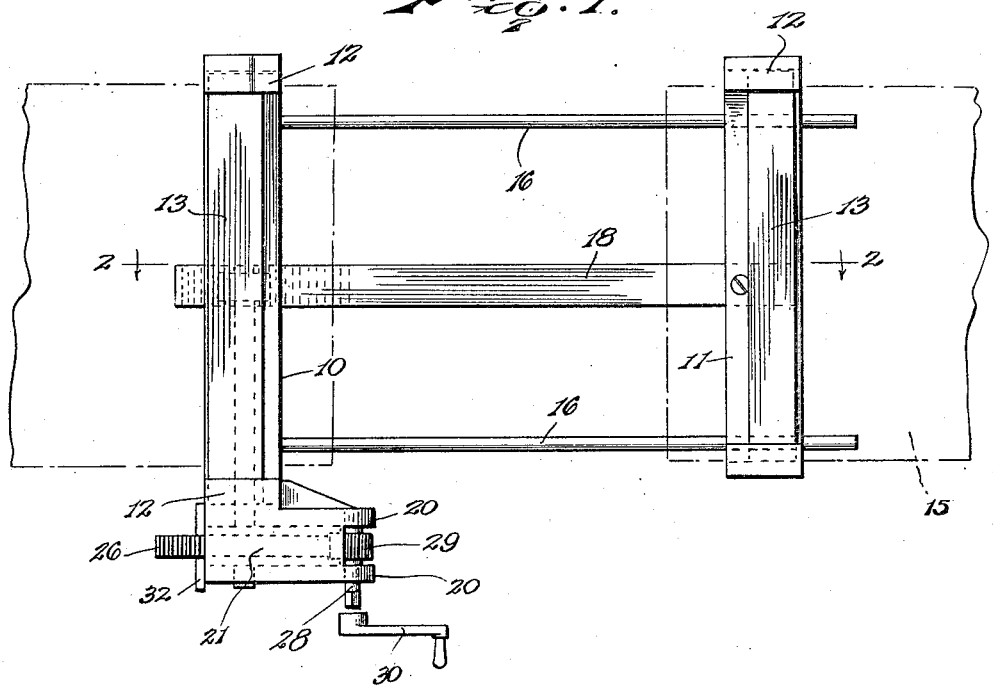
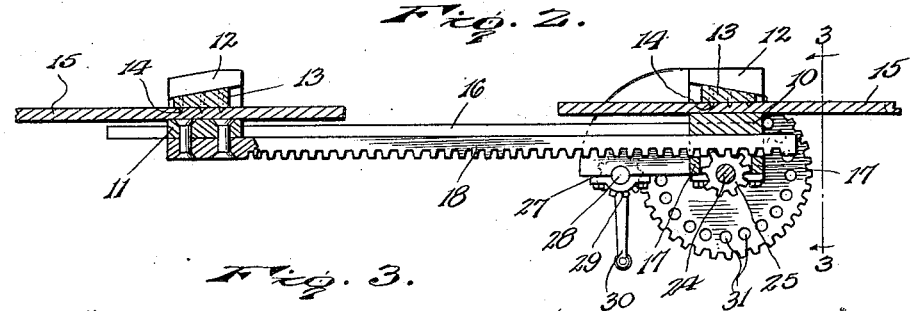
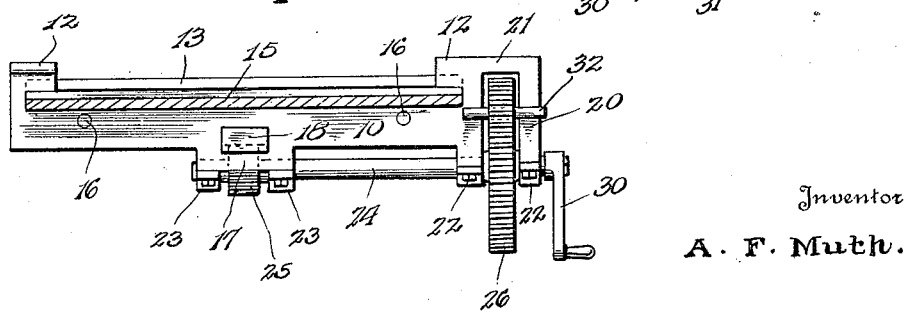
Inventor
A. F. Muth.
By Lacy & Lacy, Attorneys Patented Aug. 19, 1924.

1,505,280

UNITED STATES PATENT OFFICE.

ANTHONY F. MUTH, OF ELDORADO, KANSAS, ASSIGNOR OF FIVE-SIXTEENTHS TO JOHN J. MUTH, TWO-SIXTEENTHS TO WILFRED H. MUTH, AND ONE-SIXTEENTH TO CHARLES A. MUTH, ALL OF ELDORADO, KANSAS.

BELT TIGHTENER.

Application filed April 28, 1923. Serial No. 635,368.

*To all whom it may concern:*

Be it known that I, ANTHONY F. MUTH, citizen of the United States, residing at Eldorado, in the county of Butler and State of Kansas, have invented certain new and useful Improvements in Belt Tighteners, of which the following is a specification.

This invention relates to an improved belt tightener and seeks, among other objects, to provide a device which may be readily applied to a belt and operated for tightening the belt without the necessity for removing the belt from the belt wheels or pulleys in conjunction with which the belt is employed.

The invention seeks, as a further object, to provide a device which may be easily attached to the ends of a belt and wherein slipping of the belt will be obviated.

And the invention seeks, as a still further object, to provide a device which will be characterized by structural simplicity and which, at the same time, will prove thoroughly efficient in practical use.

Other and incidental objects will appear hereinafter.

In the drawings:

Figure 1 is a plan view of my improved belt tightener,

Figure 2 is a longitudinal sectional view on the line 2—2 of Figure 1, looking in the direction of the arrows, and Figure 3 is a detail sectional view on the line 3—3 of Figure 2, looking in the direction of the arrows.

In carrying the invention into effect, I employ companion cross bars 10 and 11 respectively. These cross bars are provided at their ends with overhanging flanges 12 having beveled inner faces and formed to coact with the beveled faces of said flanges are wedge members 13. The lower faces of the wedge members are flat to confront the flat upper faces of the bars 10 and 11 and projecting from said wedge members are spurs 14. Thus, the ends of a belt, as conventionally illustrated at 15, may be arranged to overlie the bars 10 and 11, when the wedge members 13 may be engaged with the flanges 12 of the bars and advanced therebetween for tightly clamping the belt ends, connecting the belt with said bars. Fixed upon the bar 10 near the ends thereof are parallel guide rods 16 which are freely received through the bar 11 for slidably connecting the bars and holding the bars against angular movement with respect to each other. The bar 10 is further provided at its lower side with alined guide yokes 17 which are integrally formed on the bar and fixed at one end to the bar 11 is a rack bar 18 freely received through said yokes, the rack bar being disposed substantially midway between the ends of the cross bars.

Integrally formed on the bar 10 at one end thereof are forwardly projecting parallel plates 20 connected at their upper edges by a cross web 21 cooperating with the plates to provide a gear housing. At their lower edges, said plates are, as shown in Figure 3, provided with alined bearings 22. Similar bearings 23 are provided at the ends of the guide yokes 17 and journaled through all of said bearings is a shaft 24, the bearings comprising, as will be noted, removable bearing caps, so that the shaft may be readily mounted in position. Fixed to the inner end portion of the shaft between the bearings 23 is a pinion 25 engaging the rack bar 18 and fixed to the outer end portion of the shaft between the bearings 22 is a gear 26 protected by the gear housing. In advance of the bearings 22, the side plates 20 of said housing are further provided with similar alined bearings 27 through which is journaled a power shaft 28 and fixed to said shaft between the plates 20 is a pinion 29 meshing with the gear 26. At its outer end, the shaft 28 is squared to removably receive a crank 30. Formed in the gear 26, near the periphery thereof is an annular series of spaced openings 31 and selectively engageable through said openings is a pin 32 to abut the bar 10 and housing 20, as best shown in Figure 3, for locking the shaft 24 against counter rotation.

In use, the ends of the belt 15 are connected with the cross bars 10 and 11, as previously described, and the crank 30 applied to the shaft 28, when, as will be at once appreciated in view of the preceding description, the crank may be turned for drawing the cross bars toward each other for tightening the belt. After the belt has been so tightened, the pin 32 may be inserted through one of the openings 31 in the gear wheel 26 for locking the device to hold the belt taut when a fastener may then, of course, be applied to the ends of the belt for securing said ends together. For this purpose, I have provided a highly satisfactory fastener which has been made the subject matter of a separate application. As will be perceived, the tightener may be readily applied to the belt or removed therefrom and may be used for tightening the belt without the necessity for removing the belt from its pulleys.

Having thus described the invention, what is claimed as new is:

A belt tightener including companion cross bars, means for clamping the ends of a belt to the upper sides of said bars, spaced guide yokes depending from one of said bars, a rack bar secured to the other of said bars and slidably received through said guide yokes, a gear housing upon one end of the bar having the guide yokes, a shaft journaled upon said housing and said guide yokes, a pinion on the inner end of said shaft between the yokes meshing with the rack bar, driving gearing associated with the outer end of said shaft and mounted in the upper gear housing, and means associated with said gearing and housing to prevent retrograde movement of the gearing.

In testimony whereof I affix my signature.

ANTHONY F. MUTH. [L. S.]